US010620231B2

(12) United States Patent
Peters

(10) Patent No.: US 10,620,231 B2
(45) Date of Patent: Apr. 14, 2020

(54) ULTRASONIC ANEMOMETER AND METHOD FOR DETERMINATION OF AT LEAST ONE COMPONENT OF A WIND VELOCITY VECTOR OR THE VELOCITY OF SOUND IN THE ATMOSPHERE

(71) Applicant: METEK Meteorologische Messtechnik GmbH, Elmshorn (DE)

(72) Inventor: Gerhard Peters, Hamburg (DE)

(73) Assignee: METEK Meteorologische Messtechnik GmbH, Elmshorn (DE)

(*) Notice: Subject to any disclaimer, the term of this patent is extended or adjusted under 35 U.S.C. 154(b) by 71 days.

(21) Appl. No.: 15/566,181

(22) PCT Filed: Apr. 12, 2016

(86) PCT No.: PCT/EP2016/025034
§ 371 (c)(1),
(2) Date: Oct. 12, 2017

(87) PCT Pub. No.: WO2016/165836
PCT Pub. Date: Oct. 20, 2016

(65) Prior Publication Data
US 2018/0095104 A1    Apr. 5, 2018

(30) Foreign Application Priority Data

Apr. 12, 2015  (DE) .................. 10 2015 004 408
Oct. 19, 2015  (DE) .................. 10 2015 013 399

(51) Int. Cl.
*G01P 5/08*    (2006.01)
*G01P 5/18*    (2006.01)
(Continued)

(52) U.S. Cl.
CPC .............. *G01P 5/245* (2013.01); *G01F 1/667* (2013.01); *G01P 5/08* (2013.01); *G01P 5/18* (2013.01); *G01P 13/02* (2013.01)

(58) Field of Classification Search
None
See application file for complete search history.

(56) References Cited

U.S. PATENT DOCUMENTS 3,633,415 A   1/1972 Luce
5,343,744 A   9/1994 Ammann et al.
(Continued)

FOREIGN PATENT DOCUMENTS

DE    2131847 A1    1/1973
DE    2911704 A1    9/1980
(Continued)

OTHER PUBLICATIONS

Rabenstein, "International Search Report and Written Opinion issued in International Application No. PCT/EP2016/025034", dated Jun. 24, 2016, 13 pages.

*Primary Examiner* — Natalie Huls
*Assistant Examiner* — Jermaine L Jenkins
(74) *Attorney, Agent, or Firm* — Johnson, Marcou, Isaacs and Nix, LLC

(57) ABSTRACT

An ultrasonic anemometer (7) as well as a method for determination of at least one component of a wind velocity vector and/or a velocity of sound includes at least one sound transducer at least temporarily working as a transmitter (1, 2, 3, 4, 5, 6, 15, 16) with a sound emission surface for emitting sound waves and at least one sound transducer at least temporarily working as a receiver (1, 2, 3, 4, 5, 6, 15, 16) with a sound detection surface for at least partially receiving the emitted sound waves. An evaluation unit, determines at least one component of a wind velocity vector and/or the velocity of sound, based on a recorded transit (Continued)

time, which the sound waves require on a measuring section located between the sound emission surface of the at least one transmittor and the sound detection surface of the at least one receiver to cover the distance of this measuring section. At least one measuring section is provided between a first sound emission surface of a first transmitter and a first sound detection surface of a first receiver arranged approximately vertical to the earth's surface and the first sound emission surface and/or the first sound detection surface is inclined compared to the horizontal.

11 Claims, 4 Drawing Sheets

(51) Int. Cl.
    *G01P 13/02*     (2006.01)
    *G01P 5/24*     (2006.01)
    *G01F 1/66*     (2006.01)

(56) References Cited

U.S. PATENT DOCUMENTS

| | | | | |
|---|---|---|---|---|
| 5,877,416 A | * | 3/1999 | Kapartis | G01F 1/662 73/170.08 |
| 5,979,234 A | * | 11/1999 | Karlsen | G01P 5/245 73/170.13 |
| 6,571,643 B1 | * | 6/2003 | Wood | G01P 5/245 73/597 |
| 6,601,447 B1 | | 8/2003 | Loucks et al. | |
| 7,093,502 B2 | * | 8/2006 | Kupnik | G01F 1/662 73/861.27 |
| 7,155,969 B2 | * | 1/2007 | Drutowski | G01P 5/245 73/170.02 |
| 7,934,432 B2 | * | 5/2011 | Kuhn | G01F 1/712 73/861.28 |
| 8,261,610 B2 | * | 9/2012 | Choisnet | G01P 13/02 73/170.13 |
| 9,279,707 B2 | * | 3/2016 | Wiest | G01F 1/662 |
| 2012/0173191 A1 | * | 7/2012 | Moeller | G01P 5/22 702/142 |
| 2014/0046510 A1 | * | 2/2014 | Randolph | G01P 13/045 701/14 |
| 2016/0161525 A1 | * | 6/2016 | Evans | G01P 5/245 73/170.13 |
| 2017/0227428 A1 | * | 8/2017 | Massengale | G01N 1/2214 |
| 2017/0269117 A1 | * | 9/2017 | Wang | G01P 5/24 |

FOREIGN PATENT DOCUMENTS

| | | |
|---|---|---|
| DE | 68901800 T2 | 1/1993 |
| KR | 1020120032797 A | 4/2012 |

\* cited by examiner

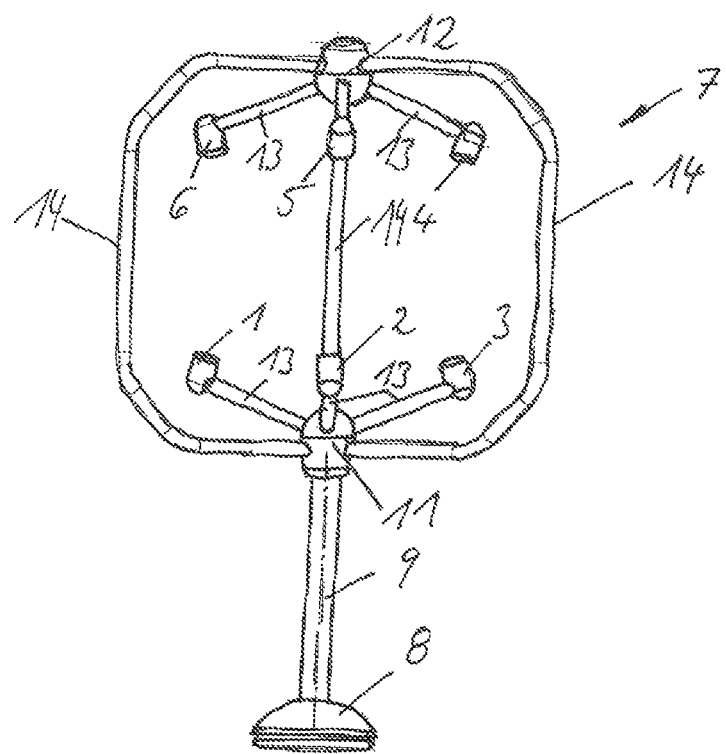
Fig. 3a)
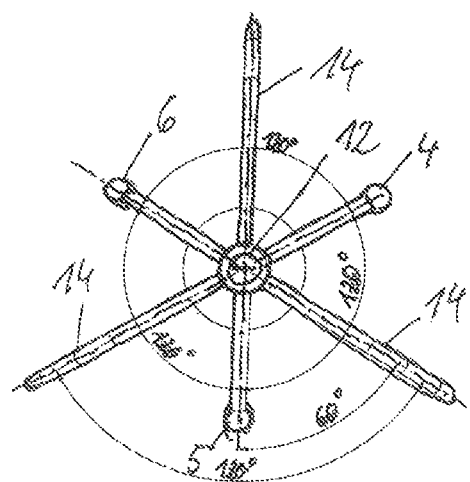
Fig. 3b)
Fig. 3

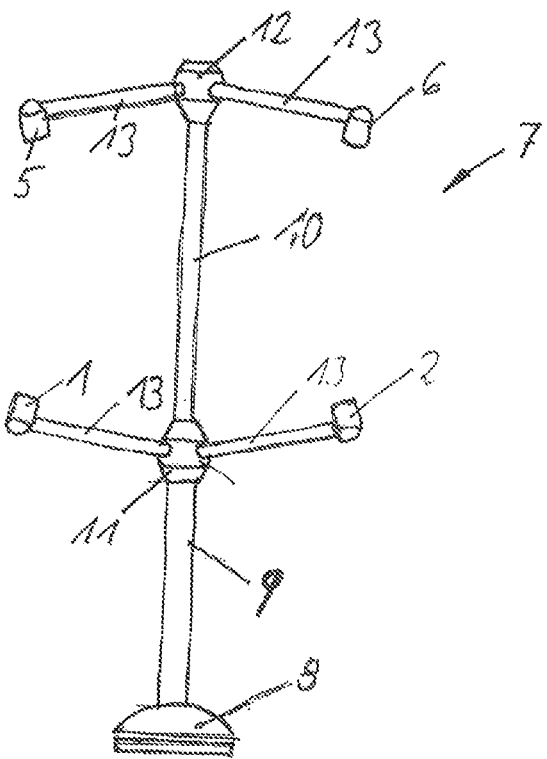
Fig. 4a)
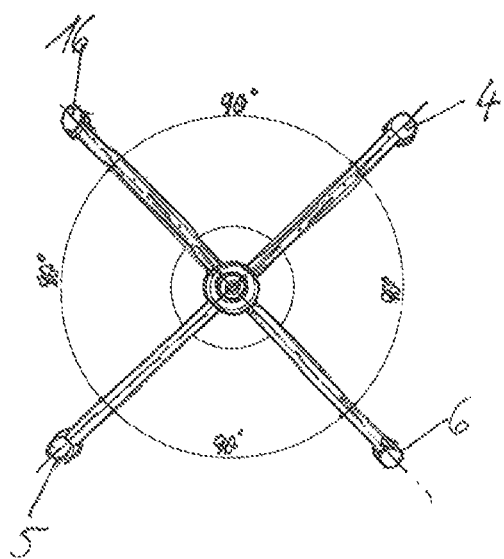
Fig. 4b)
Fig. 4

ULTRASONIC ANEMOMETER AND METHOD FOR DETERMINATION OF AT LEAST ONE COMPONENT OF A WIND VELOCITY VECTOR OR THE VELOCITY OF SOUND IN THE ATMOSPHERE

The instant application should be granted the priority dates of Apr. 12, 2015, the filing date of German Patent Application DE 10 2015 004 408.7, Oct. 19, 2015, the filing date of German Patent Application DE 10 2015 013 399.3, and Apr. 12, 2016, the filing date of the corresponding International patent application PCT/EP2016/025034.

BACKGROUND OF THE INVENTION

The invention relates to an ultrasonic anemometer for measurement of the velocity of inflowing wind with at least one transmitter for emitting sound waves and at least one receiver for at least partially receiving the emitted sound waves, and with an evaluation unit, which, taking a recorded transit time of the sound waves on a measuring section located between transmitter and receiver as the basis, determines the quantity of at least one component of the wind vector and/or the velocity of sound.

Different measuring instruments are known, using which the local measurement of the velocity of a flow field, in particular of the wind velocity, is undertaken. A special kind of wind measuring devices or so-called anemometers, resp., are ultrasonic anemometers. Ultrasonic anemometers, which have been known for a long time, use the principle of measurement of the sound wave's transit time between transmitter and receiver. Here, it is utilized that sound waves are carried along by the medium in which they propagate, so that the transit time of signals across a measuring section with a fixed length depends on the flow through the measuring section. Using sound waves with high frequency or high bandwidth, resp., transit times can be determined particularly accurate, so that on measuring sections with a short distance, high-frequency sound waves are preferably used. Since the velocity of sound depends on air temperature as well as on air humidity, usually transit times are determined in both directions, i.e. bidirectional. Furthermore, from the sum of these two transit times, the so-called virtual temperature can be calculated.

Known ultrasonic anemometers usually have several measuring sections between the individual ultrasonic transmitters and receivers, via which the velocity of sound is measured in various directions in space. From the measured values determined, electronic measuring equipment calculates the horizontal and the vertical wind velocity.

For measurements of the three wind components, in particular for measurement of the respective average values, and the velocity of sound as well as their turbulent fluctuations in the atmosphere, ultrasonic anemometers in various embodiments are used, as stated, for example, in VDI Guideline 3786 Sheet 12. Depending on the sensor head design, one, two or three measuring sections are used. These are formed by sound transducers serving as transmitter and receiver, which are located at the ends of the measuring sections and send and/or receive sound signals along the measuring sections. A substantial criterion for the arrangement of the measuring sections and the sound transducers is the minimization of measurement errors due to flow deformations or shadowing, resp., by the sound transducers themselves. The error occurring is highest, when the inflow direction is parallel to a measuring section, and smallest, when the inflow direction is perpendicular to the measuring section.

In this context, an ultrasonic anemometer is known from DE 689 01 800 T2, using which the transit times of sound waves on various measuring sections between the individual ultrasonic transducers are recorded and evaluated. The ultrasonic anemometer described has an arrangement of emitting and receiving ultrasonic transducers, which are arranged such that they define at least three different ultrasound transmission paths in the air. Furthermore, electronic measuring equipment is provided, so that, on the basis of the measurement of propagation times of the ultrasonic waves along the various paths, the wind direction as well as the wind velocity are determined considering the measured propagation times.

In general, with the ultrasonic anemometers usually used, two different types of measuring section arrangements are used. For a first type of sensor head, one measuring section is arranged vertically and two measuring sections are arranged horizontally, whereas for a second type of sensor head, three measuring sections are typically inclined by an angle of 45° to 60° and their relative azimuth angles are 120°.

The common setup of the ultrasonic anemometers considering the transit time is thus based on the arrangement of antiparallel propagation paths, on which the transit time of the sound is measured. For that, ultrasonic transducers are respectively required at both ends of each measuring section, which preferably work alternately as transmitter and as receiver. Usually, reciprocal sound transducers are used today, which respectively combine the transmitting and receiving functions.

A frequent purpose in the determination of the three wind components, in particular of the respective average values, and the velocity of sound, including the turbulent fluctuations in the atmosphere, is the determination of vertical so-called "eddy covariance" flows of air admixtures and energy, as they are part of international measurement programs, as e.g. AmeriFlux, EUROFLUX, and Mediflux. In particular, heat, water vapor, carbon dioxide and methane flows are monitored in this manner.

There are high accuracy requirements for such measurements, above all for the measurement of the vertical wind component. Measuring locations are preferably chosen such that the wind vector, on average, is directed almost horizontally.

In this context, the sound transducer arrangement of the first type first described above, with one vertical and two horizontal measuring sections, due to the vertically arranged measuring section, with almost horizontal inflow, directly provides the vertical wind component, which under these conditions is afflicted with a particularly small error by shadowing effects. A substantial disadvantage of this arrangement is the horizontal orientation of the other measuring sections. Hereby, the usable wind direction area is limited, since sectors with an inflow direction almost or completely in parallel with the section have a high shadowing error and result in a respectively lower quality of the measured horizontal wind components. Though the vertical section enables high measuring accuracy of the vertical wind component, one disadvantage of this section orientation is wetting of the lower sensor by rain or dew or, in case of heated sensor heads, by melt water. This effect can be explained by the transformation of electromechanical vibrations into sound vibrations of the air taking place via a vibrating surface or a membrane, resp., wherein the sound energy is preferably radiated vertical to the membrane. Therefore, the membranes of the vertical measuring section are oriented horizontally, which results in the fact that rain- or dewdrops may collect on the lower membrane and result in an interference with or even interruption of the measurement. For the upper sensor, a similar situation results, since due to rain, dew or, in particular with heated sensor heads, melt water, drops are formed, which then adhere to the sound transducers and partially or completely cover their surface.

With a sensor arrangement according to the second type with inclined measuring sections, the disadvantages described above are avoided, so that respectively designed ultrasonic anemometers are widely used in EC measurement programs. It is, however, disadvantageous, that the vertical wind component must be determined from the measurements along the inclined measuring sections. Thus, shadowing effects on these measuring sections influence the accuracy of the derived vertical wind component. More recent examinations have shown that with the inclination angles used, due to the shadowing effects, a significant underestimation of the vertical wind component and thus of the EC flows occurs. It is furthermore disadvantageous for the accuracy of the vertical component, that this must be indirectly determined by combination of the three inclined components.

SUMMARY OF THE INVENTION

On the basis of known ultrasonic wind measuring devices as well as the requirements and problems explained above, the invention is based on the object to further develop an ultrasonic wind measuring device, using which the transit time of sound waves is measured and evaluated, such that the problems described above are reliably avoided and a highly accurate determination of the individual components of the wind vector, in particular of the vertical wind component, and/or the velocity of sound is realized. Furthermore, the anemometer to be stated is to have a comparatively simple structural design. Simultaneously, it is to be ensured that, depending on the respective measuring requirements, it is possible to largely exclude interferences of the sound transducers by different weather conditions. A further essential feature is to consist in the fact that the electronic control equipment can be realized comparatively easy and that, on the whole, a robust, simple and cost-effectively producible ultrasonic wind measuring device can be provided.

The invention relates to an ultrasonic anemometer for determination of at least one component of a wind velocity vector and/or a velocity of sound with at least one transmitter with a sound emission surface for emitting sound waves and at least one receiver with a sound detection surface for at least partially receiving the emitted sound waves, and with an evaluation unit, which, based on a recorded transit time, which the sound waves require on a measuring section located between the sound emission surface of the at least one transmitter and the sound detection surface of the at least one receiver to cover the distance of this measuring section, determines at least one component of a wind velocity vector and/or the velocity of sound. The technical solution according to the invention is characterized by the fact that at least one first measuring section between a first sound emission surface of a first transmitter and a first sound detection surface of a first receiver is arranged approximately vertical to the earth's surface and the first sound emission surface and/or the first sound detection surface is inclined compared to the horizontal. The essential technical feature of the anemometer designed according to the invention thus consists in at least one vertically oriented measuring section being arranged between a transmitter and a receiver, although the sound emission surface as well as the sound detection surface are inclined compared to the horizontal. The expressions "wind velocity vector" or "wind vector", resp., used in the following are to be considered equivalent, since the respective vector includes the information about the velocity as well as the direction of the wind on a regular basis.

In this manner, an ultrasonic sensor for the exact three-dimensional measurement of average values of the three wind components and the velocity of sound as well as their turbulent fluctuations is provided, using which in particular the measurement of the average vertical wind component and its fluctuation is possible with particularly high accuracy. Simultaneously, in a preferred manner, the measurement of average values of the three wind components and the velocity of sound and of their turbulent fluctuations is insensitive to atmospheric influences.

Contrary to known ultrasonic anemometers, according to the invention, a vertical measuring section is realized, although the surfaces of the sound transducers or the surfaces of the sound transducer membranes, resp., are inclined compared to the horizontal. Since the beam axis of the ultrasonic signals is directed perpendicular to the membrane surfaces, the beam and measuring section axes, however, no longer correspond to each other. For this reason, sound transducers with a sufficiently wide emission and reception characteristic are preferably used.

In a preferred manner, the receivers or transmitters, resp., are arranged such that at least one, preferably two or three measuring sections essentially perpendicular to the earth's surface, which are used for the determination of the vertical wind component, and at least one, preferably two inclined measuring sections, which are used for the determination of the horizontal component of the wind, are provided. Using the technical solution according to the invention, all three wind components can be realized with a clearly reduced impact on the flow by the structure carrying the transmitters and receivers, since the transmitters and/or receivers are at least partially inclined and sound waves are still transmitted via one perpendicular and at least one inclined measuring section. In that, it is above all essential that a measuring section vertical or perpendicular, resp., to the earth's surface with an inclined transmitter and/or receiver is provided. In this context, it shall be emphasized that vertical or perpendicular means an at least almost vertical or perpendicular orientation, since the orientation is above all influenced by manufacturing and assembly tolerances. On the whole, shadowing of a measuring section is lowest, when there is a vertical inflow to the measuring section. Since the average wind vector is directed horizontally, the comparatively small vertical deflections of the instantaneous wind can be measured most exactly, when the respective measuring section stands perpendicular. Deviations in the arrangement of the measuring sections ultimately result in the measuring section no longer standing exactly perpendicular to the instantaneous wind vector, and thus a respective minimal shadowing error is unavoidable. This does not deteriorate significantly, as long as the deviation from the vertical in the direction of the measuring section is smaller than the typical vertical angle deflections of the wind vector, for example smaller than the standard deviation of the inclination angle of the wind vector.

For typical installation conditions, this standard deviation in the climate mean is about 5°. In a preferred manner, the inclination angle of a measuring section designated as perpendicular or vertical therefore lies in a range between 0° and 5°.

In a special embodiment of the invention, the sound emission surface and/or the sound detection surface have a membrane. In order to emit sound waves, the membrane is controlled such that with its targeted movement, the required sound waves are generated. If a membrane is used for the reception of sound waves, then it is deformed by the sound waves received and a respective signal is transmitted to the evaluation unit. In any case, it is essential that the transit time, which the sound requires for covering the distance of the measuring section between transmitter and receiver, is recorded and evaluated.

Furthermore, it is advantageous, when the transmitter and/or the receiver are at least temporarily heatable. In this manner, freezing of the transmitters and/or receivers or respective formation of ice in this area, resp., can be reliably prevented. Since the membrane surfaces of the ultrasonic transducers, between which the vertical measuring section is provided, are inclined compared to the horizontal, water forming can flow off or a formation of droplets is avoided.

According to a very special further development of the invention, a transmitter is used, the sound waves of which are recorded by at least two receivers arranged spaced from one another, either simultaneously or at different times. In that, such an ultrasonic anemometer is characterized by the fact that, between the first transmitter with the first sound emission surface and at least one second receiver with a second sound emission surface, a second measuring section is formed, which is inclined compared to the vertical, and that the evaluation unit, taking a recorded transit time as the basis, which the sound waves require to cover the distance of the second measuring section, determines the at least one component of the wind velocity vector and/or the velocity of sound. According to this embodiment, only one transmitter is provided, while still at least two measuring sections are formed, of which one is arranged vertically and at least one is arranged inclined compared to the vertical.

For further design of the invention, it is conceivable that the evaluation unit is designed such that, depending on a wind direction, a measuring section from a group of at least two measuring sections is used for the determination of the at least one component of the wind velocity vector and/or the velocity of sound. In an advantageous manner, it is thus possible to choose the measuring section or the measuring sections for the determination of the wind vector, including the wind components, which provide the most reliable measured values. In this context, it is conceivable to respectively select the measuring sections, which, considering the current wind direction, are least shadowed towards the wind. For the determination of the current wind direction, the ultrasonic anemometer designed according to the invention itself is preferably used. It is, however, likewise possible to supply the evaluation unit with a suitable signal, which represents the current wind direction, from an external anemometer.

Furthermore, it is preferably conceivable that the evaluation unit is designed such that at least one vertical component of the wind velocity vector is determined. Due to the arrangement of the sensors, in particular the ultrasonic transducers, wherein at least one vertical measuring section is provided, which is located between sound transducer surfaces inclined compared to the horizontal, a particularly exact determination of the vertical wind component of the wind vector can be ensured. Preferably, the evaluation unit is further designed such that an average value of the at least one component of the wind velocity vector, in particular the vertical component, is determined.

According to a further special embodiment, it is provided that the evaluation unit is designed such that three components of the wind velocity vector are respectively determined. On the basis of the determination of the three components of the wind vector, a particularly exact determination of the wind direction in space, here in the atmosphere, can be achieved. Hereby, a particularly exact determination of the wind velocity and even of the velocity of sound is likewise achieved.

Beside a specially designed ultrasonic wind measuring device, the invention also relates to a method for determination of at least one component of a wind velocity vector and/or a velocity of sound. With the method according to the invention, sound waves are emitted with at least one transmitter with a sound emission surface and the emitted sound waves are received with at least one receiver with a sound detection surface. Furthermore, with an evaluation unit, the at least one component of the wind velocity vector and/or the velocity of sound are determined based on a recorded transit time, which the sound waves on a measuring section located between the sound emission surface of the at least one transmitter and the sound detection surface of the at least one receiver require to cover the distance of this measuring section.

The method according to the invention is characterized by the fact that at least one first measuring section between a first sound emission surface of a first transmitter and a first sound detection surface of a first receiver is arranged approximately vertical to the earth's surface and that the first sound emission surface and/or the first sound detection surface are inclined compared to the horizontal.

In a preferred manner, the method is further developed such that, due to the special arrangement of the at least one transmitter and the at least one receiver, a vertical component of the wind vector can be determined particularly accurate. In that, an average value of the at least one component of the wind vector is preferably determined.

According to a special further development of the invention, depending on a wind direction, at least one measuring section is selected from a group of at least two measuring sections, in order to take the at least one selected measuring section as the basis for the determination of the at least one component of the wind velocity vector and/or the velocity of. In this manner, wind shadowing effects with a negative effect on the measurement results, in particular due to the ultrasonic transducers and/or the struts, to which these are attached, are at least minimized.

The invention further relates to a special use of an ultrasonic anemometer designed according to the invention. Thus, in a special manner, it is suitable for the determination of vertical eddy covariance flows of air admixtures and/or energy.

In the anemometer for preferred measurement of the vertical wind component described, the high accuracy of the known anemometers with one vertical and two horizontal measuring sections and the robustness against atmospheric influences of the anemometers are combined with inclined measuring sections.

Here, the anemometer according to the invention is characterized by the fact that for the determination of the horizontal wind components, no horizontally directed measuring sections are required, but the three-dimensional wind vector, including its horizontal components, can, in general, be determined with three non-coplanarly arranged measuring sections.

Therefore, in the anemometer designed according to the invention, the two remaining sections are not horizontally oriented, but inclined. In this manner, the known restrictions from section shadowing with the known wind measuring devices with one vertical and two horizontal measuring sections is avoided.

From the wide beam characteristic of the preferably used sound transducers results the possibility of a particularly easy realization of the measuring sections. Here, it is conceivable to pair one or even both sound transducers of the vertical section with further sound transducers, so that they are simultaneously used to spread out the required inclined measuring sections.

BRIEF DESCRIPTION OF THE DRAWINGS

In the following, the invention is set forth in further detail without restriction of the general inventive concept by means of special embodiments with reference to the figures. In that:

FIG. 3: shows an ultrasonic wind measuring device with a retaining frame formed by three vertical struts, in which six sound transducers are used, between which the measuring sections extend, and FIG. 4: shows an ultrasonic wind measuring device with a central strut, in which eight sound transducers are used, between which the measuring sections extend.

DETAILED DESCRIPTION OF THE PREFERRED EMBODIMENTS

Figure 1:
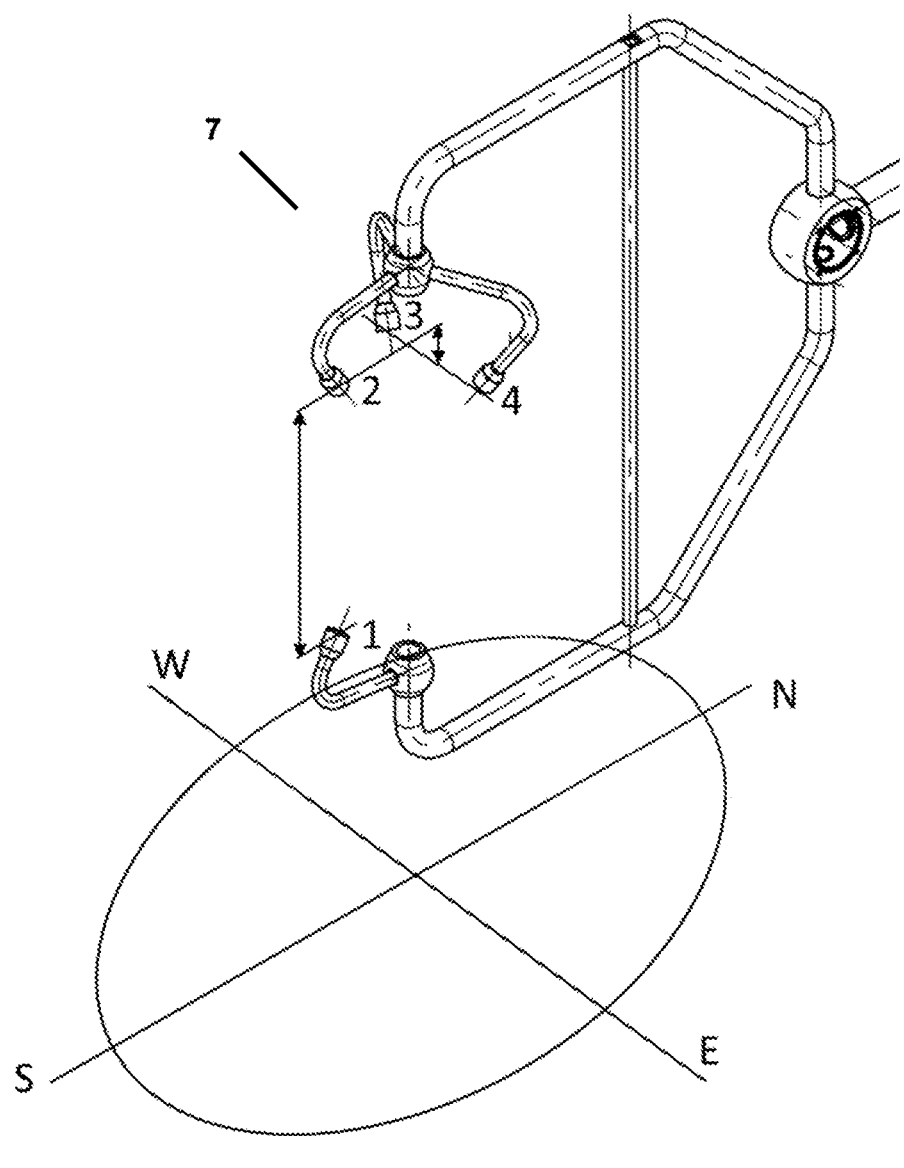
FIG. 1: shows an ultrasonic wind measuring device, in which the lower sound transducer of the vertical measuring section is simultaneously used for measuring two inclined wind components.

FIG. 1 shows an ultrasonic wind measuring device 7, in which the lower sound transducer 2 of the vertical measuring section is simultaneously used for measuring two inclined wind components. The sound transducers 1 and 2 spread out the vertical measuring section 1-2, and with the sound transducers 1 and 3 or 1 and 4, resp., the inclined measuring sections 1-3 and 1-4 are realized. The actual section angles and section lengths can deviate from this example.

According to a particularly advantageous structural further development of the embodiment according to FIG. 1, it is conceivable to additionally offset the sound transducer 2 upward and the sound transducers 3 and 4 downward. With this offset, possible shadowing by the sound transducer 2 on the sections 1-3 as well as 1-4 is avoided or at least reduced, also with inclined inflow directions.

The transit times of the sound waves recorded on the measuring sections are transmitted to an evaluation unit, in which, on the basis of the recorded transit times, three wind components are determined, wherein, due to the special arrangement of the measuring sections, in particular the vertical wind component can be determined with particular accuracy.

Figure 2:
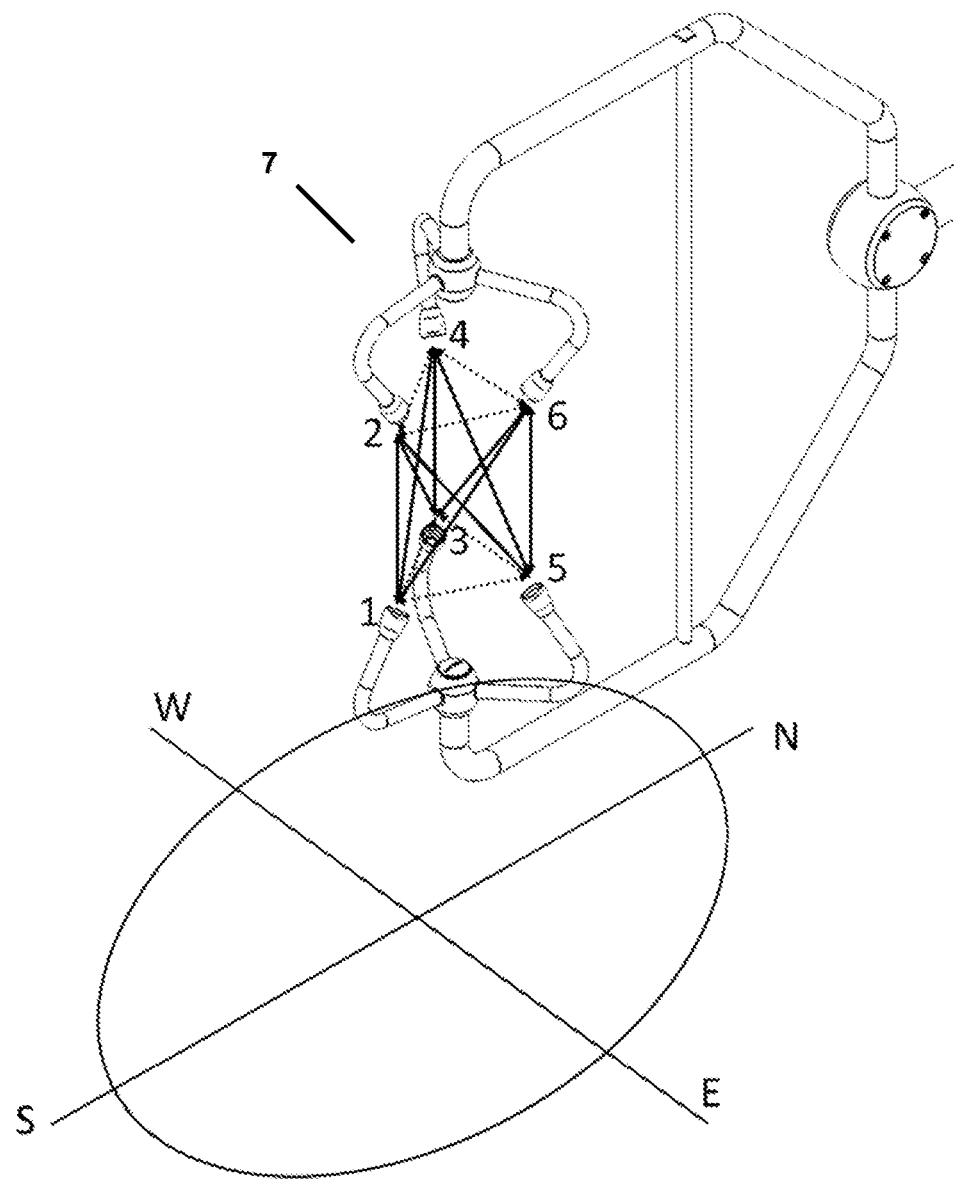
FIG. 2: shows an ultrasonic wind measuring device, in which six sound transducers are used, which spread out three vertical measuring sections.

Furthermore, FIG. 2 shows a further special embodiment of an ultrasonic wind measuring device 7 designed according to the invention. In this case, six sound transducers 1, 2, 3, 4, 5, 6 are used, using which three vertical measuring sections (1-2, 3-4, 5-6) are spread out. Using the same transducers, six inclined measuring sections are simultaneously realized (1-4, 1-6, 3-2, 3-6, 5-2, 5-4). Without higher effort compared to a conventional sound transducer arrangement for the three-dimensional wind vector, here, redundant measuring sections can be realized. Thus, depending on the respective inflow direction, a selection of those measuring sections can be made, with which, due to their position with the given inflow, the lowest shadowing effects are to be expected. Alternatively, or in addition, using multiple determinations, consensus values for the wind components can be determined, which enable higher reliability and accuracy than individual measurements on individual measuring sections. Advantageous compared to the design of the variant in FIG. 1 is the symmetrical setup of the upper and lower arrangement of the sound transducers.

In principle, the dashed connections in FIG. 2 could also be used. They are, however, of subordinate significance, since they have the undesired horizontal orientation and furthermore deviate too far from the respective beam axes, whereby the strength of the useful signal, and thus the accuracy of the measurements, is reduced.

For evaluation of the recorded transit times, a suitable evaluation unit is again provided, which determines the components of the wind vector from the recorded transit times. The output of information about the determined wind vector can be undertaken via a monitor or a display, resp., or any other suitable display unit.

FIG. 3 shows an ultrasonic wind measuring device 7 with a retaining frame formed by three bent vertical struts 14, in which six sound transducers 1-6 are used, which spread out three measuring sections. In this context, FIG. 3a) shows a side view and FIG. 3b) a top view of an ultrasonic wind measuring device 7 designed according to the invention.

Essential in the depicted ultrasonic wind measuring device 7 is, that in the central area, a retaining foot 8 is provided for fastening on a roof or at a masthead with a central strut 9 vertically extending upward. At the end of this central strut 9, three side arms 13 attached to a lower socket 11 are provided. Neighboring side arms 13, at the end of which one ultrasonic transducer 1-3 is respectively fastened, respectively enclose an angle of 120° in a horizontal plane. The side arms 13 are preferably inclined compared to the horizontal by an angle between 15° and 20°, so that hereby the ultrasonic transducers 1-6 arranged at the end of the side arms 13 and fixedly connected to the arms 13 are also inclined by this angle compared to the horizontal.

Beside the side arms 13 for the ultrasonic transducers 1-6, three U- or C-shaped, resp., vertical struts 14 are attached at the lower socket 11 at the upper end of the central strut 9, which from here extend to an upper socket 12 of the ultrasonic wind measuring device 7. In the area of the lower socket 11, the bent vertical struts 14 are respectively attached below the side arms 13, at which the ultrasonic transducers 1-3 are arranged.

At the upper socket 12 of the ultrasonic wind measuring device 7, the bent vertical struts 14 are respectively arranged above the side arms 13 for the ultrasonic transducers 4-6 and rotated by an angle of 60° in the horizontal compared to the side arms 13 with the ultrasonic transducers 4-6.

With the special embodiment of the invention depicted in FIG. 3, in which at least one vertical measuring section between two ultrasonic transducers 1-6 is realized with a sound emission surface inclined compared to the horizontal, an ultrasonic wind measuring device 7 is provided, which, in a preferred manner, can be mounted at exposed locations for wind measurement, as e.g. at mastheads. Simultaneously, the bent vertical struts 14 are designed such that, on the one hand, sufficient stiffness and stability of the anemometer are ensured and simultaneously an almost interference-free inflow of wind to the individual ultrasonic transducers 1-6 is achieved.

In the embodiment shown in FIG. 3, two ultrasonic transducers 1-6 with inclined sound emission or sound reception surfaces, resp., are respectively arranged vertically on top of each other. Here, in a preferred manner, ultrasonic transducers 1-6 are used, which can emit sound waves in different directions and receive sound waves from different directions, wherein the sound transducers 1-6 preferentially have a hemispherical emission characteristic or reception characteristic, resp.

For measurement of the velocity and direction of the inflowing wind, the wind measuring device 7 depicted in FIG. 3 can be used to measure and evaluate the transit times of the sound waves between two ultrasonic transducers 1-6 vertically arranged on top of each other as well as respectively between one of the lower sound transducers 1-3 and the upper sound transducers 4-6. Here, three measuring sections can be spread out from each sound transducer 1-6, wherein at least one of these measuring sections extends in a vertical direction. Here, in principle, it is irrelevant for the realization of the invention, whether the individual sound transducers 1-6 transmit successively or simultaneously and whether fixed transmitters and receivers are provided among the ultrasonic transducers 1-6 or the individual ultrasonic transducers 1-6 respectively act alternatingly as transmitters and as receivers.

For evaluation of the recorded transit times, a suitable evaluation unit is again provided, which determines the components of the wind vector from the recorded transit times. The output of information about the determined wind vector can be undertaken via a monitor or a display, resp., or any other suitable display unit.

In FIG. 4, a further embodiment of an ultrasonic wind measuring device 7 is depicted, which uses the invention. Here, FIG. 4a shows a side view and FIG. 4b a top view of an ultrasonic wind measuring device 7 designed according to the invention.

The ultrasonic transducers 1-6, 15, 16 are, as already set forth in connection with FIG. 3, attached to side arms 13, which are arranged inclined compared to the horizontal. According to the embodiment shown in FIG. 4, however, eight ultrasonic transducers 1-6, 15, 16 are provided, of which respectively four are arranged in one horizontal plane. Neighboring ultrasonic transducers 1-6, 15, 16 respectively enclose an angle of 90° in a horizontal plane and are fastened to sockets 11, 12 of the ultrasonic wind measuring device 7 via side arms 13. Respectively four ultrasonic transducers 1-3, 15 are fastened to a lower socket 11 and four to an upper socket 12.

A retaining foot 8 is again provided, to which a central retaining strut 9 is fastened, which extends in a vertical direction up to a lower socket 11 for fastening the side arms 13 with the ultrasonic transducers 1-3, 15. According to this embodiment, the lower and upper sockets 11, 12 for fastening of the side arms 13 with the ultrasonic transducers 1-6, 15, 16, however, are not connected with one another via bent vertical struts 14 extending in the outside area, but via a centrally arranged central strut 10. In this case, too, the ultrasonic transducers 1-6, 15, 16 are arranged such that an almost undisturbed inflow of the wind is ensured and the ultrasonic wind measuring device 7, in a preferred manner, can be mounted on mastheads.

For the measurement of velocity and direction of the inflowing wind, with the wind measuring device 7 depicted in FIG. 4, the transit times of the sound waves between two ultrasonic transducers 1-6, 15, 16 vertically arranged on top of each other as well as respectively between one of the lower sound transducers 1-3, 15 and the upper sound transducers 4-6, 16 can again be measured and evaluated. Here, four measuring sections can be spread out from each sound transducer 1-6, 15, 16, wherein one of these measuring sections extends in a vertical direction. Here, in principle, it is irrelevant for the realization of the invention, whether the individual sound transducers 1-6, 15, 16 transmit successively or simultaneously and whether fixed transmitters and receivers are provided among the ultrasonic transducers 1-6, 15, 16 or the individual ultrasonic transducers 1-6, 15, 16 respectively act alternatingly as transmitters and as receivers.

For evaluation of the recorded transit times, a suitable evaluation unit is provided in this embodiment, too, which determines the components of the wind vector from the recorded transit times. The output of information about the determined wind vector can be undertaken via a monitor or a display, resp., or any other suitable display unit.

The specification incorporates by reference the disclosures of German Patent Application DE 10 2015 004 408.7, filed Apr. 12, 2015, German Patent Application DE 10 2015 013 399.3, filed Oct. 19, 2015, and International Patent Application PCT/EP2016/025034, filed Apr. 12, 2016.

The present invention is, of course, in no way restricted to the specific disclosure of the specification and drawings, but also encompasses any modifications within the scope of the appended claims.

LIST OF REFERENCE SIGNS

1 Sound transducer
2 Sound transducer
3 Sound transducer
4 Sound transducer
5 Sound transducer
6 Sound transducer
7 Ultrasonic wind measuring device
8 Retaining foot
9 Central strut, bottom
10 Central strut, center
11 Lower socket
12 Upper socket
13 Side arm
14 Bent vertical struts
15 Sound transducer
16 Sound transducer

The invention claimed is:

1. An ultrasonic anemometer (7) for determination of at least one component of a wind velocity vector and/or a velocity of sound, comprising:
  at least one sound transducer at least temporarily working as at least one transmitter (1, 2, 3, 4, 5, 6, 15, 16), each at least one transmitter having a sound emission surface for emitting sound waves;
  at least one sound transducer at least temporarily working as at least one receiver (1, 2, 3, 4, 5, 6, 15, 16), each at least one receiver having a sound detection surface for at least partially receiving emitted sound waves,
  wherein at least three transmitters and/or receivers are arranged such that a first measuring section oriented substantially vertically relative to the earth's surface is at least temporarily provided between the sound emission surface of one of the transmitters and the sound detection surface of one of the receivers, the first measuring section being used to determine a vertical component of wind, and such that at least two second measuring sections inclined relative to the first measuring section are provided, the second measuring sections being used to determine a horizontal component of the wind, wherein the sound emission surface and the sound detection surface are inclined relative to the earth's surface, and wherein the first measuring section and the at least two measuring sections are arranged non-coplanary relative to one another; and an evaluation unit to determine a three-dimensional wind vector comprising at least one component of a wind velocity vector and/or a velocity of sound based on a recorded transit time that the sound waves require on the first and second measuring sections to cover the distance of the first and second measuring sections.

2. The ultrasonic anemometer according to claim 1, wherein the at least one first measuring section is arranged with an inclination angle between 0° and 5° relative to the earth's surface.

3. The ultrasonic anemometer according to claim 1, wherein the sound emission surface and/or the sound detection surface has a membrane.

4. The ultrasonic anemometer according to claim 1, wherein the at least one transmitter and/or the at least one receiver is at least temporarily heatable.

5. The ultrasonic anemometer according to claim 1, wherein the evaluation unit is configured, such that, depending on a wind direction, a measuring section from a group of at least two measuring sections is used for the determination of the at least one component of the wind velocity vector and/or the velocity of sound.

6. The ultrasonic anemometer according to claim 1, wherein the evaluation unit is configured such that at least a vertical component of the wind velocity vector is determined.

7. The ultrasonic anemometer according to claim 1, wherein the evaluation unit is configured such that an average value of the at least one component of the wind velocity vector is determined.

8. The ultrasonic anemometer according to claim 1, wherein the evaluation unit is configured such that three components of the wind velocity vector are respectively determined.

9. A method for determination of at least one component of a wind velocity vector and/or a velocity of sound, comprising:

emitting sound waves with at least one sound transducer at least temporarily working as a transmitter (1, 2, 3, 4, 5, 6, 15, 16) with a sound emission surface;

receiving emitted sound waves with at least one sound transducer at least temporarily working as a receiver (1, 2, 3, 4, 5, 6, 15, 16) with a sound detection surface, wherein at least three transmitters and/or receivers are arranged such that a first measuring section oriented substantially vertically relative to the earth's surface is at least temporarily provided between the sound emission surface of one of the transmitters and the sound detection surface of one of the receivers, the first measuring section configured to determine a vertical component of wind and such that at least two second measuring sections inclined relative to the first measuring section are provided, the second measuring sections configured to determine a horizontal component of the wind, wherein the sound emission surface and the sound detection surface are inclined relative to the earth's surface, and wherein the first measuring section and the at least two measuring sections are arranged non-coplanary relative to one another; and determining, with an evaluation unit, a three-dimensional wind vector comprising at least one component of a wind velocity vector and/or a velocity of sound based on a recorded transit time, which the sound waves require on the first and second measuring sections to cover the distance of the first and second measuring sections.

10. The method according to claim 9, wherein an average value of the at least one component of the wind vector is determined.

11. The use of an ultrasonic anemometer according to claim 1 for determination of vertical eddy covariance flows of air admixtures and/or energy.

* * * * *